(No Model.)
S. B. HART.
GRAIN CONVEYER.
No. 411,439. Patented Sept. 24, 1889.
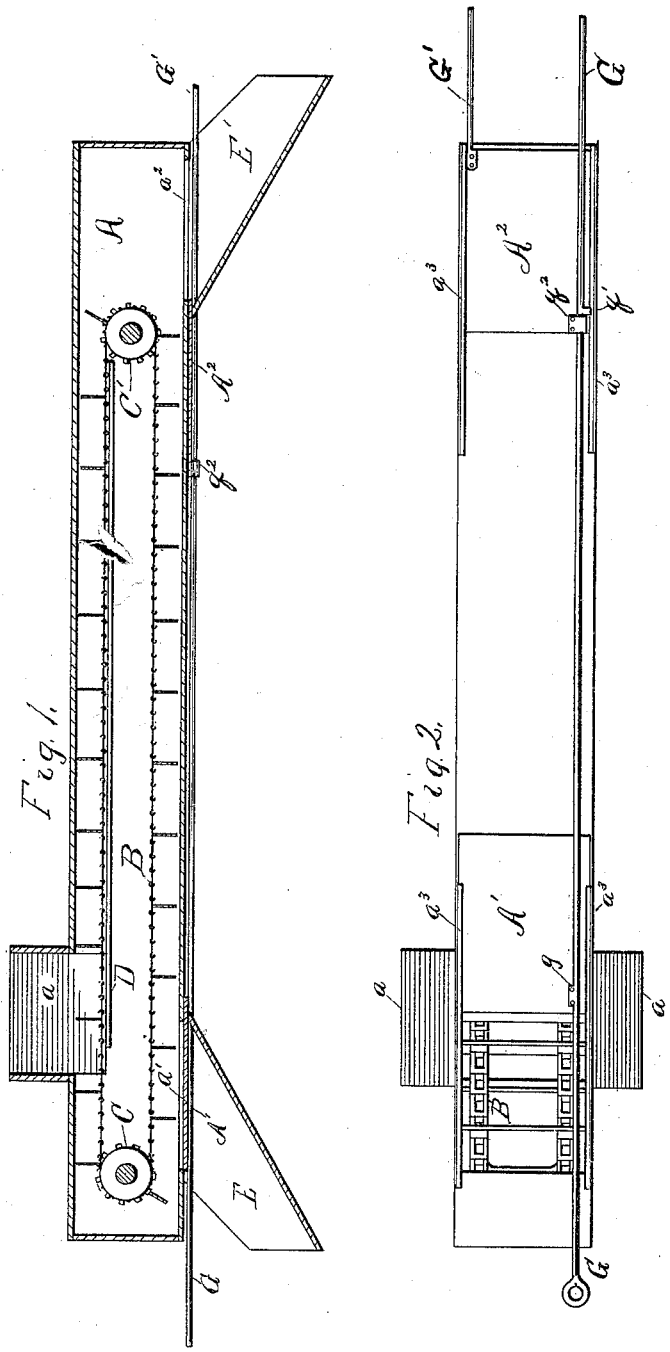
Witnesses
A. Sherburne
Harry Bitner
Inventor
Stacy B. Hart,
By His Attorneys
Hill & Dixon

UNITED STATES PATENT OFFICE.

STACY B. HART, OF PEORIA, ILLINOIS, ASSIGNOR TO THE HART WEIGHER COMPANY, OF SAME PLACE.

GRAIN-CONVEYER.

SPECIFICATION forming part of Letters Patent No. 411,439, dated September 24, 1889.

Application filed December 21, 1888. Serial No. 294,346. (No model.)

*To all whom it may concern:*

Be it known that I, STACY B. HART, a citizen of the United States of America, residing at Peoria, in the county of Peoria and State of Illinois, have invented certain new and useful Improvements in Grain-Conveyers, of which the following is a description.

My invention relates to that class of grain-conveyers which are used upon grain-separators to receive the grain after it has passed through the separator and carry it to whichever side of the machine it may be desirable to deliver it from.

The object of my invention is to provide means whereby the delivery of the grain may be changed from one side of the separator to the other without reversing the motion of the conveyer-chain; and to this end it consists in the combination and arrangement of parts hereinafter described, and clearly defined in the claims hereto annexed.

In the drawings, Figure 1 is a central longitudinal vertical section of a conveyer which illustrates my invention, and Fig. 2 a view of the bottom of said conveyer with the grain-spouts taken away to show the grain-valves and their attachments.

In this class of conveyers it has been the practice to change the delivery of the grain from one side of the separator to the other by reversing the motion of the conveyer-chain, thereby causing great wear and tear of the gearing, as well as constant danger of breaking the weaker portions. To remove these objectionable features I have so arranged the grain valves or outlets with reference to the opening through which the conveyer receives the grain that the motion of the conveyer-chain in one direction tends to carry the incoming grain over both valves, thereby enabling me to deliver it from either by simply opening that valve and closing the other. I have also made certain additional improvements, hereinafter described, whereby the conveyer is made more compact and less liable to choke up.

Referring to the drawings, A is the conveyer-tube; B, the conveyer-chain of the ordinary form and construction, running upon the sprocket-wheels C C', one of which is geared to some portion of the separator and driven thereby in the direction which will carry the lower portion of the chain in Fig. 1 from left to right. The conveyer-tube is provided with the grain inlet or hopper $a$, and the two outlets $a'$ and $a^2$ at opposite ends of the tube. The sprocket-wheel C, which is located at the end of the tube at which the grain is received, is placed beyond the outlet $a'$, between said outlet and the end of the tube, and the hopper $a$ is located so as to drop the grain between said wheel C and the edge of the outlet $a'$ opposite therefrom. To do this without undesirably lengthening the conveyer-tube, I place a horizontal partition D beneath the upper half of the chain B, extending it from a point well to the right of the hopper $a$ to a point slightly overhanging the outlet $a'$, but far enough from the wheel C to leave a free passage between it and said wheel for the grain. By this means I am enabled to place the hopper nearer the center of the tube and utilize the upper portion of the chain to carry the grain delivered upon this partition to the proper place, whereby I can place the wheel C much nearer the outlet $a'$ than would otherwise be possible and save that much in the length of the tube. The outlets $a'$ and $a^2$ are fitted with suitable valves A' and $A^2$ for closing the same, and with suitable spouts E and E' to carry the grain away.

In operating this conveyer, the preferred form of which has been described, the grain entering through the inlet $a$ is carried first to the outlet $a'$, and if this is open, as in Fig. 2, passes through into the spout E. If the valve A' closes the outlet $a'$, as in Fig. 1, the grain passes on to the outlet $a^2$ and is delivered therefrom. All that remains, therefore, is to provide suitable means for opening and closing the valves A' and $A^2$. These valves may be of any desired form; but I prefer the simple slide-valve A' $A^2$, guided in suitable grooves $a^3$, and controlled by rods G G'. (Shown in Fig. 2.) The valves are here shown as closing outward, and the valve A' represented as open and valve $A^2$ as closed. In this position the grain is delivered through the outlet $a'$. To change the delivery to the opposite end, it is necessary to close valve A' and open valve $A^2$, and this can be done from either side of the separator by means of the rod G, rigidly attached to valve $A'$ at $g$ and bearing a lug $g'$, which engages with a stop $g^2$ upon valve $A^2$ when moved from right to left. In changing the delivery back again to outlet $a'$, however, the valve $A^2$ cannot be closed simultaneously with the opening of valve $A'$, inasmuch as in that case the grain at the moment in transit between $a'$ and $a^2$ would collect over valve $A^2$ and clog the chain. For this reason the lug $g'$ is allowed a free movement from the stop $g^2$ when the rod G is moved from left to right. This will of course leave both valves open. If it is desired to close valve $a^2$ after the grain in transit has passed through, it can be done by means of rod $G'$. It is, however, of little moment whether this valve is closed or not, as no grain will be carried thereto while valve $A'$ is open.

I claim as new and desire to secure by Letters Patent—

1. The conveyer-tube A, provided with the pulleys C C', carrying an endless conveyer-chain B continuously in the direction which will move the grain upon the bottom of the tube from the pulley C to the pulley C', said tube having the outlets $a'$ $a^2$ practically at its opposite ends, but between the pulley C and the end opposite, and provided with means for closing them at will, in combination with a spout adapted to deliver grain upon the bottom of the tube between the pulley C and the opposite edge of the adjacent outlet $a'$, as and for the purpose stated.

2. A conveyer-tube having the pulleys C C', chain B, outlets $a'$ $a^2$, valves $A'$ $A^2$, the partition D, stopping short of the pulley C sufficient to allow the grain to drop between it and said pulley, and a spout adapted to deliver grain upon said partition, substantially as and for the purpose set forth.

3. The combination of the conveyer-tube and the valves $A'$ $A^2$, with the rod G, rigidly attached to valve $A'$ and bearing a lug $g'$ engaging with a stop $g^2$ upon valve $A^2$, to open the same when valve $A'$ is closed, but disengaging from said stop when the rod G is moved in the opposite direction, as and for the purpose stated.

STACY B. HART.

In presence of—
 FRANK HITCHCOCK,
 DUDLEY N. TYNG.